United States Patent [19]

Akashi

[11] Patent Number: 4,792,821

[45] Date of Patent: Dec. 20, 1988

[54] AUTO-FOCUS APPARATUS IN A CAMERA

[75] Inventor: Akira Akashi, Yokohama, Japan

[73] Assignee: Canon Kabushiki Kaisha, Tokyo, Japan

[21] Appl. No.: 137,810

[22] Filed: Dec. 24, 1987

[30] Foreign Application Priority Data

Jan. 12, 1987 [JP] Japan .................................. 62-4585

[51] Int. Cl.⁴ .............................................. G03B 3/00
[52] U.S. Cl. ..................................... 354/402; 354/409
[58] Field of Search ................ 354/400, 402, 404, 405, 354/406, 407, 408, 409; 250/201, 201 PF, 204

[56] References Cited

U.S. PATENT DOCUMENTS

| | | | |
|---|---|---|---|
| 4,200,378 | 4/1980 | Shenk | 354/400 |
| 4,335,942 | 6/1982 | Tsunekawa et al. | 354/400 |
| 4,470,676 | 9/1984 | Kinoshita et al. | 354/406 |
| 4,538,892 | 9/1985 | Sakai et al. | 354/409 X |
| 4,545,664 | 10/1985 | Sakai et al. | 354/400 |
| 4,588,278 | 5/1986 | Horigome | 354/409 X |
| 4,593,988 | 6/1986 | Akiyama et al. | 354/409 |
| 4,641,942 | 2/1987 | Sakai et al. | 354/406 |
| 4,687,915 | 8/1987 | Sakai et al. | 354/402 X |

FOREIGN PATENT DOCUMENTS

105237   8/1980   Japan .................................. 354/409

*Primary Examiner*—W. B. Perkey
*Attorney, Agent, or Firm*—Fitzpatrick, Cella, Harper & Scinto

[57] ABSTRACT

This specification discloses an auto-focus apparatus for repetitively effecting focus detection and in-focus judgement and lens driving, and in particular an auto-focus apparatus designed such that in a case where the lens cannot be regarded as being in focus as a result of focus detection, when the deviation from the in-focus point is small, lens driving is effected and in-focus is judged to thereby shorten the time until the judgement of in-focus and when the lens driving when the deviation from the in-focus point is small has not been properly effected, the judgement of in-focus when the deviation from the in-focus point is small is inhibited to thereby enable an accurate in-focus judging operation to be accomplished.

7 Claims, 4 Drawing Sheets

AUTO-FOCUS APPARATUS IN A CAMERA

BACKGROUND OF THE INVENTION

1. Field of the Invention

This invention relates to an auto-focus apparatus.

2. Related Background Art

Various auto-focus apparatuses have heretofore been proposed and manufactured.

In an auto-focus apparatus, a light beam is received, for example, by two light-receiving portions through a photo-taking lens, and the degree of coincidence between the image patterns of the two image lights on the light-receiving portions is detected to thereby find the direction up to in-focus and the defocus amount, whereby the lens is driven by the defocus amount. In such auto-focus device, said defocus amount has been found in the stopped state of the lens to enhance the accuracy, and then the lens has been driven by the defocus amount, whereafter the defocus amount at the driven position has been again found to confirm whether the lens has been shifted to the in-focus position by the preceding lens driving, and only when the shift to the in-focus position has been confirmed as the result, the display of in-focus has been effected.

That is, in the auto-focus apparatus according to the prior art, after the defccus amount has once been detected by the focus detecting operation, the lens has been driven by the detected defocus amount and at that position, focus detection has been again effected and at this time, the judgement of in-focus has been done, whereby the indication of in-focus has been effected for the first time.

According to the above-described in-focus judging method, the indication of in-focus can be reliably effected only during the in-focus and the result of the in-focus judgement can be made high in accuracy, while after the lens driving to the in-focus position, the second focus detecting operation is necessary, and this gives rise to the problem that much time is required until the indication of in-focus.

Usually, the photographer effects the shutter releasing operation after the indication of in-focus is effected and therefore, the above-described in-focus judging and indicating system has the disadvantage of low rapidity of photographing.

To solve the above-noted problem, under a situation in which the defocus amount as a result of focus detection is below a predetermined value, that is, the lens is in the vicinity of in-focus and can be reliably shifted to the in-focus state if the lens driving based on the defocus amount is effected, it is conceivable to effect the indication of in-focus immediately after the lens driving based on the defocus amount, thereby shortening the time until the indication of in-focus. However, if the above-described system is adopted, there will arise the convenience that even if during the lens driving under said situation, the lens comes to the mechanical limit position such as the infinity position or the close distance position and any further lens driving becomes impossible, the indication of in-focus is effected immediately after the lens driving as described above.

SUMMARY OF THE INVENTION

One aspect of the application is to provide an auto-focus apparatus in which when the calculated defocus amount based on the focus detecting operation is below a predetermined value, the indication of in-focus is immediately effected without the second focus detecting operation being performed after the lens driving and when during the lens driving, the lens is not moved by an amount corresponding to the defocus amount, the second focus detecting operation is performed after the lens driving irrespective of the magnitude of the calculated defocus amount and only when the judgement of in-focus is done as a result of the second detecting operation after the lens driving, the indication of in-focus is effected to thereby solve the above-noted problem.

One aspect of the application is to provide an auto-focus apparatus designed under the above object such that first and second judgement modes are provided when the judgement of in-focus is done, and when the defocus amount is within a first range which can be regarded as in-focus, the in-focus is judged in the first mode, and when the judgement of in-focus in the first mode is not done, the lens driving based on said defocus amount is effected and at this time, whether said defocus amount is within a second range greater than said first range is judged in the second mode and when in the second mode, said defocus amount is within said second range, in-focus is judged and further, even if the judgement of in-focus in the second mode is done, when the then lens is not driven by an amount corresponding to the defocus amount, the judgement of in-focus in said second mode is cancelled.

Other objects of the present invention will become apparent from the following detailed description of an embodiment thereof taken in conjunction with the accompanying drawings.

DESCRIPTION OF THE PREFERRED EMBODIMENT

Figure 1:
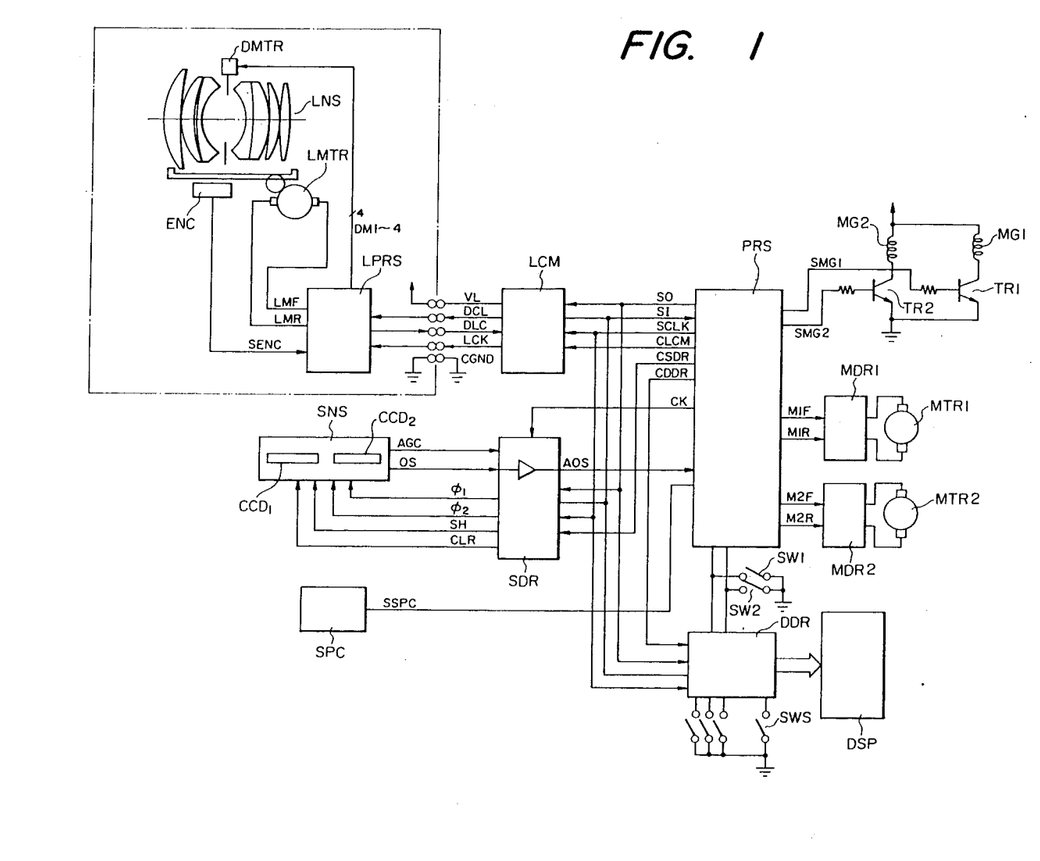
FIG. 1 is a circuit diagram showing an embodiment of a camera having an auto-focus apparatus according to the present invention.

FIG. 1 is a circuit diagram showing an embodiment of a camera provided with a signal auto-focus apparatus according to the present invention. In FIG. 1, PRS designates a control device of the camera which is, for example, a one-chip microcomputer having a ROM, a RAM and an A/D converting function therein and which performs the operations of the camera such as the automatic exposure control function, the automatic focus detectnng function, the film advance and the film rewinding in accordance with a program stored in the ROM.

The microcomputer PRS communicates with the surrounding circuits and the lens by the use of communication signals SO, SI and SCLK, and controls the operations of the respective circuits and the lens.

SO is a data signal output from the microcomputer PRS, SI is a data signal input to the microcomputer PRS, and SCLK is a signal synchronous with the signals SO and SI.

LCM denotes a lens communication buffer circuit which provides a power source VL to the lens when the camera is being operated, and works as a buffer for the communication between the camera and the lens when the signal CLCM from the microcomputer PRS is at a high potential level (hereinafter abbreviated as "H", and a low potential level will hereinafter be abbreviated as "L").

When the microcomputer PRS renders the signal CLCM to "H" and delivers predetermined data as the signal SO in synchronism with the signal SCLK, the circuit LCM is designated and outputs the buffer signals LK and DCL of the signals SCLK and SO to the lens through the contact between the camera and the lens. Simultaneously therewith, the circuit LCM outputs the buffer signal of the signal DLC from the lens (the portion encircled by a dot-and-dash line) as the signal SI, and the microcomputer PRS inputs the data of the lens as the signal SI in synchronism with the signal SCLK.

SDR designates a driving circuit for a line sensor device SNS for focus detection, and the driving circuit SDR is selected when the signal CSDR from the microcomputer PRS is "H", and is controlled by the microcomputer PRS in accordance with the signals SO, SI and SCLK.

SNS denotes a sensor device including, for example, a pair of CCD line sensors $CCD_1$ and $CCD_2$. $\phi 1$ and $\phi 2$ designate clocks for driving the CCDs which are produced by the driving circuit SDR in response to the clock signal from the microcomputer PRS, SH denotes a signal for causing charges accumulated in the line sensors $CCD_1$ and $CCD_2$ to be transferred to a transfer portion, and CLR designates a clear signal for clearing the accumulated charges in the line sensors $CCD_1$ and $CCD_2$, and these signals are formed in the driving circuit SDR controlled by the microcomputer PRS.

The output signal OS of the sensor devcce SNS is an image signal accumulated in each pixel of the sensors $CCD_1$ and $CCD_2$ which is time-serially output in synchronism with the clocks $\phi 1$ and $\phi 2$, and is output for each bit of the sensors $CCD_1$ and $CCD_2$ and amplified by an amplifying circuit in the circuit SDR, and thereafter is input as a signal AOS to the microcomputer PRS. The microcomputer PRS inputs the signal AOS from an analog input terminal and A/D-converts it by the internal A/D converting function in synchronism with a signal CK, and thereafter stores it into a predetermined address of the RAM.

A signal AGC which also is the output signal of the sensor device SNS is the output of an accumulation control sensor in the device SNS, and is used to control the accumulation time of the sensors $CCD_1$ and $CCD_2$.

SPC designates a photometering sensor which receives light through the photo-taking lens. The output SSPC of the photometering sensor SPC is input to the analog input terminal of the microcomputer PRS and A/D-converted, whereafter it is used for automatic exposure control (AE).

DDR denotes a switch sensing and displaying circuit which is selected when the signal CDDR from the microcomputer PRS is "H", and control of the communication thereof with the microcomputer PRS is effected by the signals SO, SI and SCLK. That is, it changes over the display of the camera on the basis of data supplied from the microcomputer PRS, and communicates to the microcomputer PRS the switch condition of a group of switches SWS opened and closed in response to various operating members, including switches SW1 and SW2 operatively associated with a release button.

MDR1 and MDR2 designate driving circuits for film feeding and shutter charging motors MTR1 add MTR2. These driving circuits execute the forward and reverse revolutions of the motors by signals M1F, M1R, M2F and M2R.

MG1 and MG2 denote magnets for starting the movement of the forward and rearward shutter curtains. These magnets are supplied with electric power by signals SMG1 and SMG2 and amplifying transistors TR1 and TR2, and shutter control is effected by the microcomputer PRS.

The switch sensing and displaying circuit DDR, the motor driving circuits MDR1 and MDR2 and shutter control have no direct relation to the present invention and therefore need not be described in detail.

The signal DCL input to the control circuit LPRS in the lens in synchronism with the synchronizing signal LCK is the data of a command from the camera to the lens, and the operation of the lens for the command is predetermined.

The control circuit LPRS analyzes the input command in accordance with a predetermined procedure, and effects the operations of focus adjustment and aperture control and outputting of the various parameters of the lens from the output DLC (such as the open F-number, the focal length, and the coefficient of the defocus amount vs. the amount of axial movement).

An example of the generally axially movable single lens is shown in the embodiment, and when a command of focus adjustment is sent from the camera, signals LMF and LMR are delivered to a focus adjusting motor LMTR in accordance with the amount and direction of drive sent at the same time to thereby drive the motor LMTR, whereby the optical system is moved in the direction of the optic axis to effect focus adjustment. The amount of movement of the optical system is monitored by the signal SENC of an encoder circuit ENC and, at a point of time whereat a predetermined movement of the optical system has been completed, the signals LMF and LMR are rendered into "L" and the motor LMTR is braked.

When a command of aperture control is sent from the camera, a conventional stepping motor DMTR operatively associated with the aperture mechanism is driven in accordance with the number of aperture steps sent at the same time. The stepping motor can be open-controlled and therefore does not require an encoder for monitoring the operation thereof.

The circuit LPRS is provided with a memory storing parameters such as the focal length information f of the lens (in the case of a zoom lens, focal length information corresponding to the zoomed state) in respective predetermined address portions, and a control circuit for detecting the presence or absence of the monitor signal SENC and judging the stopped condition of the lens, or receiving the monitor signal SENC and comparing the amount of drive of the lens represented by said signal SENC with the defocus amount to be described and rendering the signals LMF and LMR when said two amounts are coincident with each other into "L" to thereby stop the motor LMTR.

A display device DSP has a display element such as an LED for displaying the in-focus and the out of focus detection.

As the encoder ENC, use is made of a pulse plate or the like rotated, for example, in response to movement of the lens and generating a pulse as said monitor signal.

The operation of the camera constructed as described above will now be described with reference to FIG. 2.

When a power source switch, not shown, is operated, electric power is supplied to the microcomputer PRS, which thus executes the stored program.

Figure 2A:
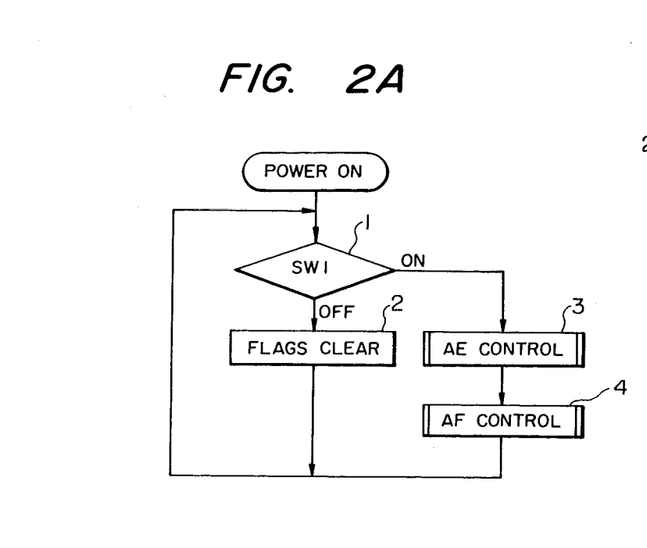
FIGS. 2A-2D illustrate the program contained in the microcomputer PRS of FIG. 1.

FIG. 2A is a flow chart showing the general flow of said program. When the execution of the stored program is started by the above-mentioned operation, the detection of the condition of the switch SW1 adapted to be closed by the first stage operation of the shutter button is first effected at step 1, and if the switch SW1 is OFF, the internal flags of the microcomputer PRS are all cleared at step 2 and 0 is set in each flag. Said steps 1 and 2 are repetitively executed until the switch SW1 becomes ON, and shift is made to step 3 by the switch SW1 becoming ON. The detecting operation of the switch SW1 is executed by rendering the signal CDDR from the microcomputer PRS into "H", designating the circuit DDR, transmitting the detection command of the switch SW1 as the signal SO to the circuit DDR, causing the circuit DDR to detect the ON or OFF condition of the switch SW1, and transmitting the result of the detection as the signal SI to the microcomputer PRS. Step 3 is the subroutine of AE control, and a series of operation controls such as photometric calculation process, exposure control, and shutter charge and film advance after exposure are effected in this AE subroutine. The AE subroutine has no direct relation to the present invention and therefore need not be described in detail, but the epitome of this AE control subroutine is as follows.

As long as the switch SW1 is ON, photometering and exposure control operation are effected each time the AE control subroutine is executed. Also, when the second stage operation of the shutter button is effected and the switch SW2 becomes ON, the releasing operation is effected by the interruption process and control of the aperture or the shutter time is effected in conformity with the exposure amount found in the above-mentioned exposure control operation, and shutter charge and film feeding operation are effected after the termination of the exposure.

Assuming that the first stage operation of the shutter button has been performed, photometering and calculation process are effected at step 3, whereafter advance is made to step 4.

Figure 2B:
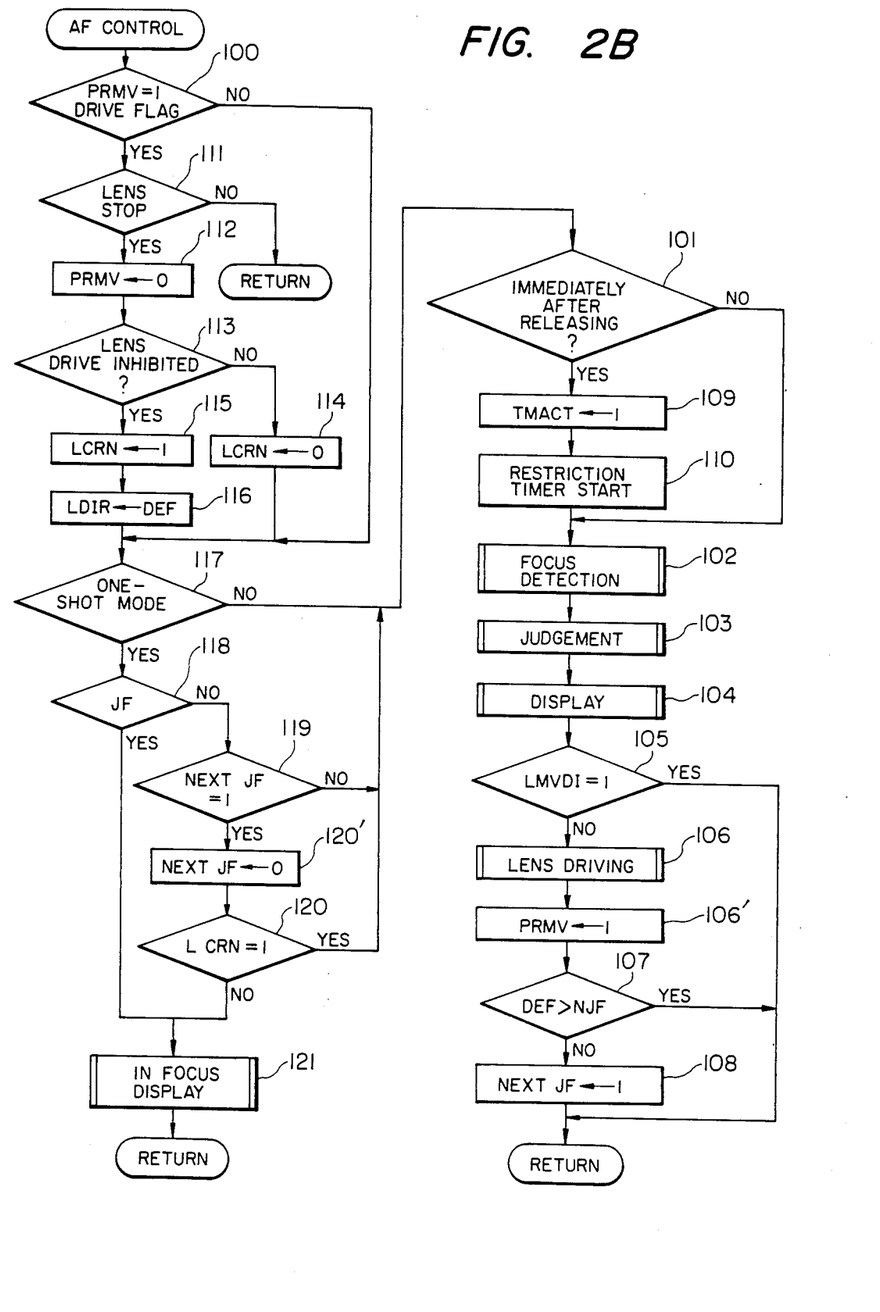

Step 4 is the AF control subroutine, and the AF control subroutine shown in FIG. 2B is executed.

In this AF control subroutine, the set condition of flag PRMV is first detected at step 100. When the AF control subroutine is executed for the first time, all flags are cleared and 0 is set at step 2 and therefore, advance is made to step 117 and subsequent steps.

Step 117: The mode of auto-focus is discriminated, and in the case of the servo mode, advance is made to step 101, and in the case of the one-shot mode, advance is made to step 118.

Assuming that the servo mode is set as the mode, the step proceeds to 101.

Step 101: Whether film feed has been effected in the immediately preceding AE control subroutine is determined.

When it is judged that film feed has been effected in the AE control subroutine by step 3 executed immediately before step 101 is executed, that is, the step 101 has been executed for the first time after the termination of photographing, flag TMACT is set to 1 at step 109, and the counting of a lens drive restriction timer is started at step 110, whereafter shift is made to step 102. Also, when it is judged that film feed has not been effected in the AE control subroutine at step 3 executed immediately before step 102 is executed, shift is made to step 102 without steps 109 and 110 being executed.

Only the first stage operation of the shutter button is being effected and therefore the film feeding operation is not performed in the AE control subroutine and thus, advance is made to step 102 without steps 109 and 110 being executed.

Step 102: The focus detection subroutine is executed.

Figure 2C:
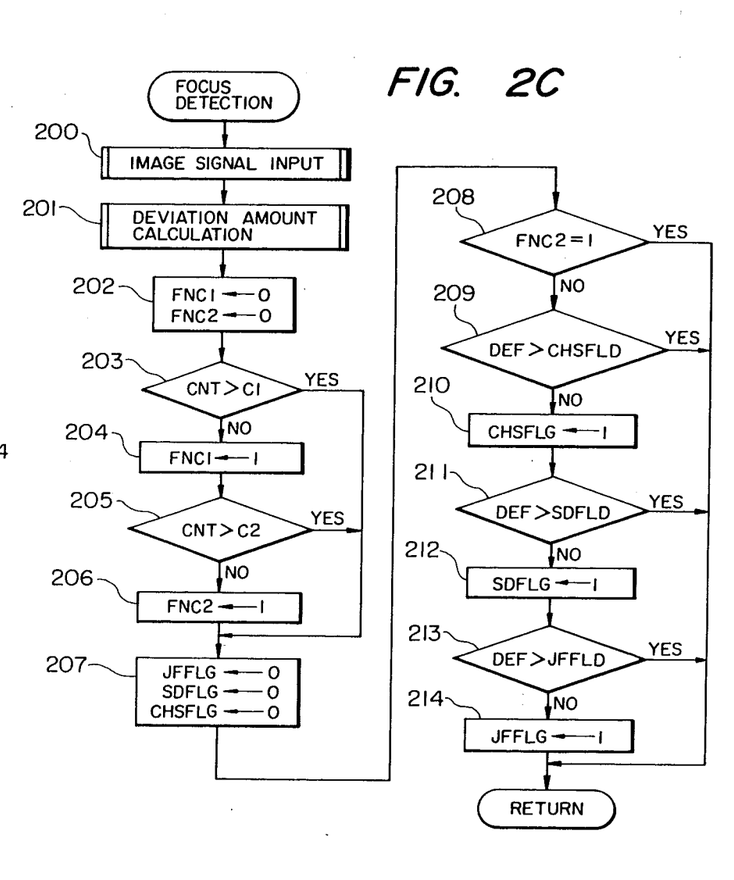

This focus detection subroutine is executed after step 200 shown in FIG. 2C.

The focus detection subroutine will now be described.

Step 200: The image signal input subroutine is executed.

In this image signal input subroutine, the signal CSDR is first rendered into "H" by the microcomputer PRS and the driving circuit SDR is selected, and the signal SO is transmitted to this driving circuit SDR. The then signal SO is an accumulation start command and in response to this command, the driving circuit SDR transmits the signal CLR to the line sensor device SNS and clears the image accumulation signals of the CCD line sensors, whereafter it causes the accumulating operation for images to be effected. An image light beam which enters through the photo-taking lens is incident on the CCD line sensors $CCD_1$ and $CCD_2$ of the line sensor device SNS, and the image positions on the sensors $CCD_1$ and $CCD_2$ are determined in conformity with the focus state. More particularly, in the in-focus state with respect to an object to be photographed, the same image patterns are projected onto the same positions on the sensors $CCD_1$ and $CCD_2$, and in the front or rear focus state, the image patterns on the sensors $CCD_1$ and $CCD_2$ are projected onto positions deviated symmetrically from each other in conformity with the direction of focus deviation thereof and the amount of deviation. Accordingly, by detecting the amount and direction of positional deviation between the image patterns on the sensors $CCD_1$ and $CCD_2$, the direction of focus deviation and the amount of deviation are detected.

The image patterns projected onto the position corresponding to the focus state in the manner described above are accumulated in the sensors $CCD_1$ and $CCD_2$ for a predetermined time after said image signal has been cleared, whereafter the signal SH and clocks $\phi 1$ and $\phi 2$ are supplied from the driving circuit SDR to the sensor device SNS. The accumulation time of said image patterns is determined on the basis of the output AGC of the accumulation control sensor in the sensor device SNS.

When the signal SH and clocks $\phi 1$ and $\phi 2$ are supplied to the sensor device SNS in the manner described above, the image signals accumulated in the respective picture elements of the sensors $CCD_1$ and $CCD_2$ are time-serially delivered in succession as the output OS from the output end of the sensor device SNS, and are amplified by an amplifying circuit in the driving circuit SDR and successively input as signals AOS to the microcomputer PRS. The microcomputer PRS converts said signals AOS to digital values by the internal A/D converting function thereof and stores them in a predetermined RAM.

By the above-described operation the image signals of each sensor corresponding to the image patterns on the sensors $CCD_1$ and $CCD_2$ are stored as digital values in the RAM and thus, the image signal input subroutine is terminated and shift is made to step 201.

Step 201: The defocus amount calculation subroutine is executed. In this subroutine, the amount of deviation from the in-focus and the direction of deviation are calculated as the defocus amount DEF on the basis of the digital values corresponding to the image patterns on the sensors $CCD_1$ and $CCD_2$ found in the image signal input subroutine. The specific method of calculating said defocus amount has no direct relation to the present invention and therefore need not be described in detail, but it is such that since the degree of coincidence between the image patterns on the sensors $CCD_1$ and $CCD_2$ is determined by the focus state as described above, the digital values of said sensors corresponding to said patterns are compared with each other to find the degree of coincidence between the data thereof, thereby finding the amount and direction of deviation from the in-focus state, that is, the defocus amount DEF. Also, in this subroutine, the contrast CNT is found from the digital values corresponding to the image patterns on the sensors $CCD_1$ and $CCD_2$, and the detection of this contrast is also known and therefore need not be described in detail.

Step 202: 0 is set in flags FNC1 and FNC2. These flags are flags for indicating the degree of reliability of focus detection, and in the present embodiment, 0 is set in the two flags when the degree of reliability is highest, 1 and 0 are set in the flags FNC1 and FNC2, respectively, when the degree of reliability is high, and 1 is set in the flag FNC2 when the degree of reliability is worst.

Step 203: The contrast CNT found at said step 201 is compared with a predetermined value $C_1$.

When the contrast CNT is $CNT > C_1$, shift is made to step 207, and when $CNT < C_1$, shift is made to step 204.

Step 204: 1 is set in the flag FNC1 and advance is made to step 205.

Step 205: The contrast CNT is compared with a predetermined value $C_2$. However, $C_1$ and $C_2$ are in the relation that $C_1 > C_2$. When $CNT > C_2$, shift is made to step 207, and when $CNT < C_2$, shift is made to step 206.

Step 206: 1 is set in the flag FNC2.

At said steps 203–207, the flags FNC1 and FNC2 are both set to 0 when the contrast CNT is highest; the flags FNC1 and FNC2 are set to 1 and 0, respectively, when the contrast CNT is $C_1 > CNT > C_2$; and the flags FNC1 and FNC2 are both set to 1 when the contrast CNT is $C_2 > CNT$.

After the set conditions of the flags FNC1 and FNC2 have been determined at said steps, step 207 is executed.

Step 207: 0 is set in flags JFFLG, SDFLG and CHSFLG. This step is a step for initializing said three flags.

Step 208: The condition of the flag FNC2 is discriminated.

When the flag FNC2 is set to 1, the focus detection subroutine is terminated and return is made to the AF control subroutine, and then shift is made to the decision subroutine of step 103. When the flag FNC2 is set to 0, shift is made to step 209.

Step 209: Comparison of the defocus amount DEF found at said step 201 with a predetermined value CHSFLD is effected, and when DEF>CHSFLD, the focus detection subroutine is terminated, and return is made to the AF control subroutine, and shift is made to the decision subroutine of step 103. The predetermined value CHSFLD is set to a value a little greater than the value for which the defocus amount represents the vicinity of infocus, and DEF>CHSFLD shows that the defocus amount up to in-focus is great.

Also, when CHSFLD≧DEF in the above-described comparison, shift is made to step 210.

Step 210: The flag CHSFLG is set to 1.

Thus, when the defocus amount DEF is within the predetermined value CHSFLD, that is, when the defocus amount is not so great, the flag CHSFLG is set to 1.

Step 211: Comparison of the defocus amount DEF with a predetermined value SDFLD is effected and when DEF>SDFLD, shift is made to the judgement subroutine of step 103. Said predetermined value SDFLD is set to the relation that CHSFLD>SDFLD, and this predetermined value SDFLD is set to a defocus amount representative of the vicinity of in-focus.

Also, when SDFLD≧DEF is determined in said comparison, 1 is set in the flag SDFLD at step 212. Thus, when the defocus amount DEF is in the vicinity of in-focus, the flag SDFLG is set to 1.

Step 213: Comparison of the defocus amount DEF with a predetermined value JFFLD is effected and when DEF>JFFLD, the focus detection subroutine is terminated, and return is made to the AF control subroutine and shift is made to the decision subroutine of step 103. The value of said JFFLD is in the relation that SDFLD>JFFLD, and is set to a value for which the defocus amount can be regarded as in-focus.

Also, when JFFLD≧DEF is determined in said comparison, 1 is set in the flag JFFLG at step 214 and shift is made to the judgement subroutine of step 103.

In the above-described focus detection subroutine, the set conditions of the flags FNC1 and FNC2 are determined in conformity with the degree of reliability of focus detection and when the flag FNC2 is 1, that is, in the other cases than the case where the degree of reliability is very low under low contrast, the flag JFFLG is set to 1 in conformity with the defocus amount DEF during the in-focus; the flag SDFLG is set to 1 during the vicinity of in-focus; and the flag CHSFLG is set to 1 when in the focus state somewhat far from the vicinity of in-focus.

After the focus detection subroutine has been executed, the focus detection subroutine is terminated and return is made to the AF control subroutine, and the judgement subroutine of step 103 is executed as described above.

Figure 2D:
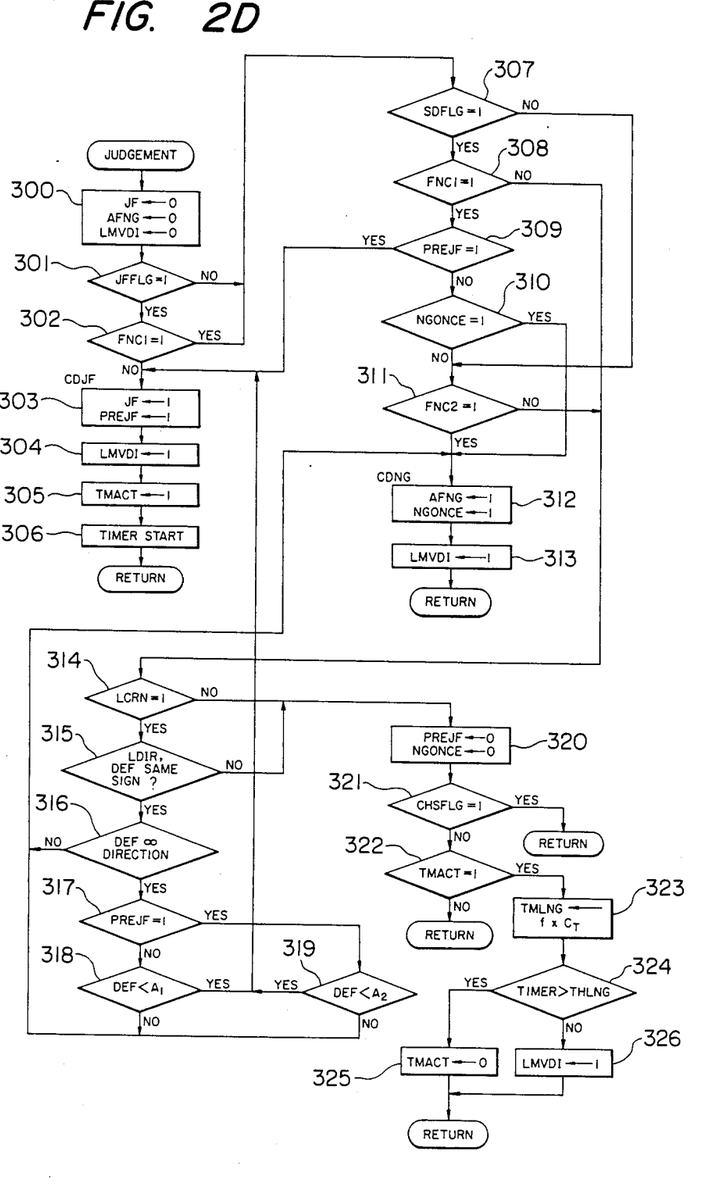

The judgement subroutine is shown in and after the step 300 of FIG. 2D.

Step 300: 0 is set in flags JF, AFNG and LMVDI, and these flags are initialized.

Step 301: The set condition of the flag JFFLG is detected, and when JFFLG is 1, that is, when in focus, shift is made to step 302, and when JFFLG is 0, shift is made to step 307.

Assuming that the flag JFFLG is set to 1, the condition of the flag FNC1 is determined at step 302, and when the flag FNC1 is 0, shift is made to step 303, and when the flag FNC1 is 1, shift is made to step 307.

Thus, the result of the focus detecting operation indicates the in-focus and the focus detecting operation under high contrast condition is performed, and only when the result of the detection is of a high degree of reliability, step 303 and subsequent steps are executed.

When advance has been made to step 303 in the manner described above, 1 is set in in-focus flag JF and 1 is set in flag PREJF at step 303, and advance is made to the next step 304 and subsequent steps.

Step 304: 1 is set in flag LMVDI.

Step 305: 1 is set in flag TMNCT.

Step 306: The lens drive restriction timer is started to perform its counting operation, the judgement subroutine during the in-focus is terminated, return is made to the AF control subroutine and shift is made to the display subroutine of step 104.

The above-described operation is the operation when the in-focus judgement has been made under a high degree of reliability, but during the other times, the flag JFFLG is set to 0 or the flag FNC1 is set to 1 and therefore, at step 301 or step 302, the above-mentioned set condition is detected and step 307 and subsequent steps are executed.

Step 307: The condition of the flag SDFLG is determined, and when the flag SDFLG is 0, shift is made to step 311, and when the flag SDFLG is 1, shift to made to step 308. The flag SDFLG is set to 1 when the vicinity of in-focus is judged by the focus detection as described above, and therefore, during the vicinity of in-focus, shift is made to step 308.

Step 308: The set condition of the flag FNC1 is detected, and when the flag FNC1 is 0, advance is made to step 314, and when the flag FNC1 is 1, advance is made to step 309. Assuming that the flag FNC1 is set to 1, description will now be made of the case where advance has been made to step 309.

Step 309: The condition of the flag PREJF is discriminated. This flag is set to 1 when step 303 has been executed, that is, when the in-focus has been judged in the preceding focus detecting operation, and it is 0 by the flag clearing operation of step 2 before the first focus detecting operation, and it is 0 when the first decision subroutine is executed. The first decision subroutine is now being executed and therefore, shift is made to step 310.

Step 310: The condition of flag NGONCE is detected. This flag NGONCE is a flag which is set to 1 when the out of focus detection has been judged in the preceding focus detection, and it is 0 when the first decision subroutine is executed, and shift is made to step 311.

Step 311: The set condition of the flag FNC2 is determined. This flag FNC2, as described above, is set to 1 under very low contrast and therefore, advance is made to step 312 and subsequent steps when focus detection is effected under very low contrast.

The condition under which shift is made to step 312 at the above-mentioned step during the first focus detecting operation is the case under very low contrast, and in the other cases, shift is made to step 314 or step 303.

Also, at step 312, a flag AFNG for the impossibility of focus detection and the flag NGONCE are set to 1, and at step 313, the flag LMVDI is set to 1 and the decision subroutine is terminated and therefore, in the first focus detecting operation, steps 312 and 313 are executed only when the focus detection under very low contrast is effected, and thus, the flag AFNG for the impossibility of focus detection is set to 1.

As is apparent from the foregoing description, when the first focus detecting operation has been effected, the flag JF for in-focus is set to 1 only when the degree of reliability of focus detection is highest and the in-focus is judged, and the flag AFNG for the impossibility of focus detection is set to 1 only when the degree of reliability is lowest, and in the other cases, step 314 and subsequent steps are executed, but if the focus detecting operation is performed earlier, the operation as described below will take place with the result of the preceding focus detection taken into consideration.

In the process wherein the above-described series of steps are being executed in the judgement subroutine, the set condition of the flag PREJF is determined at step 309, and when this flag PREJF is set to 1, shift is made to step 303. The flag PREJF, as previously described, is set to 1 when step 303 was executed at the last time, that is, when the in-focus was judged in the preceding detecting operation, and therefore, even when the vicinity of in-focus is judged in the current focus detecting operation and the degree of reliability is not high, if the in-focus was judge at the last time, shift is made to step 303 and subsequent steps and the flag JF for in-focus is set to 1.

Also, when the impossibility of focus detection has been judged in the preceding focus detecting operation, even if the vicinity of in-focus is judged in the current focus detecting operation and the degree of reliability is not high, it is detected at step 310 that the flag NGONCE is 1 and therefore, advance is made to said step 312 and the flag AFNG for the impossibility of focus detection is set to 1.

The conditions under which the flags JF and AFNG are set to 1 by the operations of said steps 300–312 and the decision subroutine is terminated are as shown in Table 1 below.

TABLE 1

| | | |
|---|---|---|
| JF = 1 | The first focus detecting operation and the second and subsequent focus detecting operations when PREJF = 0 | The second and subsequent focus detecting operations when PREJF = 1 |
| | JFFLG = 1 and FNC1 = 0 | The left-mentioned condition or SDFLG = 1 |
| | when in-focus is judged and the degree of reliability is high | and FNC1 = 1 and PREJF = 1 |
| | | when the vicinity of in-focus is judged and the degree of reliability is not high and in-focus was judged at the last time |
| AFNG = 1 | The first focus detecting operation and the second and subsequent focus detecting operations when NGONCE = 0 FNC2 = 1 (when the degree of reliability is lowest) | The second and subsequent focus detecting operations when NGONCE = 1 |
| | | The left-mentioned condition or SDFLG = 1 and FNC1 = 1 and NGONCE = 1 |

TABLE 1-continued

⎡ when the vicinity of in-focus
is judged and the degree of
reliability is not high and
the impossibility of focus
detection was judged at the
last time ⎤

The reason why, as described above, the flag JF or AFNG is set to 1 when a high degree of reliability is not obtained even if the vicinity of in-focus is judged this time by the result of the preceding focus detecting operation is the consideration that the degree of reliability of the judgement of the vicinity of infocus as the result of the current focus detecting operation is not so high and therefore there is a doubt as to whether the lens can be accurately moved to the in-focus position even if the lens is driven in accordance with the result of the judgement and in this case, if the in-focus or the out of focus detection is judged in the preceding judgement, approximately accurate judgement will be made even if the result of the preceding judgement is relied on and adopted as the result of the current judgement.

Further, in the above-described case, when the lens is driven in accordance with the result of the judgement, the result of the preceding judgement is cancelled by the above-mentioned information of not so high a degree of reliability even if the in-focus or the out of focus detection is once judged and therefore, even after the in-focus or the impossibility of focus detection is once judged, return is immediately made to the state of the judgement of the not-in-focus or the state of the judgement of the possibility of focus detection, and said judgement of the in-focus or said judgement of the impossibility of focus detection changes each time the focus detecting operation is performed, and thus the stability for the judgement of the in-focus or the judgement of the impossibility of focus detection is lost, and the aforementioned reason is for preventing the display to be effected when the in-focus or the impossibility of focus detection is displayed or the lens is driven as will be described later from changing at all times to confuse the photographer or keep the lens unstopped for any length of time. Consequently, in the present invention, once the in-focus or the impossibility of focus detection has been judged, even if the result of that judgement differs from the judgement of the in-focus or the impossibility of focus detection, the result of that judgement, if not high in degree of reliability, will be neglected and preference will be given to the result of the preceding judgement and thus, the above-mentioned object will be achieved.

Description will now be made of a case where the shift to step 314 is allowed when the steps 300-313 have been executed.

It should be noted that this step 314 is executed when the other conditions than the conditions shown in Table 1 above are satisfied, that is, in the other cases than the in-focus or the impossibility of focus detection.

Step 314: The set condition of flag LCRN is detected.

This flag LCRN is a flag which is set to 1 when as will be described later, the lens is shifted to a mechanical limit position such as the infinity position or the close distance position and cannot be driven any more, and when the flag LCRN is 0, shift is made to step 320, and when the flag LCRN is 1, shift is made to step 315. Let it be assumed that the lens is in the limit position. In such case, step 315 is executed.

Step 315: The signs of the content of a memory LDIR and the defocus amount DEF found in the focus detecting operation are determined. The memory LDIR stores therein the defocus amount found in the preceding focus detecting operation and the defocus amount DEF represents the amount and direction of deviation as described above and therefore, the sign of the defocus amount DEF is determined in the direction of front focus or rear focus, i.e., the direction in which the lens is driven.

When the sign of the preceding defocus amount in the memory LDIR and the sign of the current defocus amount are not coincident with each other, it is possible to drive the lens and therefore, shift is made to step 320, and if said signs are coincident with each other, any further driving of the lens is impossible and therefore, advance is made to step 316. Let it be assumed that advance has been made to step 316. Step 316: Whether the sign of the defocus amount DEF is representative of the direction in which the lens should be driven toward the infinity side is detected, and when said sign is representative of the driving in the direction toward the infinity side, advance is made to step 317, and when said sign is representative of the direction in which the lens should be driven toward the close distance side, advance is made to step 312.

Accordingly, when the lens is in the close distance side limit position and further driving of the lens in the close distance direction has been directed, shift is made to step 312, and at the steps 312 and 313, 1 is set in the flag AFNG, etc., and the decision subroutine is terminated. That is, in the situation as described above, it is impossible to obtain the in-focus state and therefore, this situation is regarded as the state of the impossibility of focus detection and the processing during the focus detected state is effected.

Also, when the lens is in the infinity side limit position and further driving of the less in the infinity direction has been directed, the set condition of the flag PREJF is judged at step 317, and when the flag PREJF is judged as 1, i.e., the in-focus at the last time is judged, advance is made to step 319, and when the flag PREJF is judged as 0, i.e., the in-focus at the last time is not judged, advance is made to step 318.

Let it be assumed that shift has been made to step 318.

Step 318: The defocus amoutt DEF is compared with a predetermined value $A_1$, and when $DEF < A_1$, shift is made to step 303, and when $A_1 < DEF$, shift is made to step 312.

When as a result of this comparison, the defocus amount is smaller than the predetermined value $A_1$, processing similar to that during the judgement of the in-focus is effected at the step 303, and when the defocus amount is greater than the predetermined value $A_1$, processing similar to that during the judgement of the impossbbility of focus detection is effected at the step 312.

That is, even when the lens is in the infinity side position and is not in the original in-focus state, if the defocus amount is within the predetermined value, that is, in the case of a small defocus amount, there is no problem even if the in-focus is judged when the characteristic of the lens is taken into consideration, and in such case, the lens is regarded as being in focus and the in-focus processing of step 303 and subsequent steps is effected, and when the defocus amount is greater than said predetermined value, it is impossible to bring about the in-focus state and it is also impossible to regard the lens as being in-focus and therefore, under such a situation, shift is made to step 312 and the processing for the impossibility of focus detection is effected.

Also, when at step 317, the flag PREJF is 1, that is, the in-focus is judged in the preceding focus detecting operation, step 319 is executed. When at this step 319, as at step 318, DEF<$A_2$ as a result of the comparison of the defocus amount DEF with a predetermined value $A_2$, advance is made to step 303 and subsequent steps for the same reason as set forth above and the processing for the judgement of the in-focus is effected, and when DEF>$A_2$, advance is made to step 312 and the processing for the impossibility of focus detection is effected.

The relation between the predetermined values $A_1$ and $A_2$ is $A_2$>$A_1$. The reason why there is thus provided the difference between $A_1$ and $A_2$ is that the probability with which the lens is in the in-focus state is higher when the in-focus is judged as a result of the preceding focus detection, and there is no problem even if the defocus amount DEF regarded as the in-focus in such case is greater than the defocus amount DEF when judged as the non-in-focus at the last time and also, as previously described, the in-focus state after the in-focus has once been judged is stabilized.

The relation between the predetermined value $A_1$ and the original defocus amount JFFLD for in-focus judgement is $A_1$>JFFLD.

The reason why $A_1$ is set to $A_1$>JFFLD and the defocus amount regarded as in-focus is made great at the infinity end position and the in-focus judgement is not made severe is that as described above, when the characteristic of the lens is considered, even if the defocus amount is more or less great at the infinity end position, there is actually no problem in regarding it as in-focus, and thus the probability with which in-focus is attained is enhanced and detection of in-focus can be accomplished within a short time.

The above-described steps 315-318 are a case where the flag LCRN is set to 1 and the lens driving directions as the result of the preceding focus detection and the result of the current focus detection are identical, that is, the lens cannot be driven in accordance with the result of the focus detection, but in the other cases, that is, in a case where the lens can be driven in the in-focus direction on the basis of the result of the focus detection and in a case where the current focus detection is the first one even if the lens is in the limit position and the judgement that the lens should be further driven toward the limit position has been brought as a result of the focus detection, advance is made to step 320 and subsequent steps.

Step 320: 0 is set in the flags PREJF and NGONCE.

Step 321: The condition of the flag CHSFLG is judged.

When the flag CHSFLG is set to 1, that is, when the defocus amount obtained in the focus detecting operation at steps 209 and 210 is smaller than said predetermined value CHSFLD and the defocus amount till the in-focus has not become great, the decision subroutine is terminated later.

When CHSFLG is 0, that is, when the defocus amount has become graat, step 322 is executed.

Step 322: The set condition of flag TMACT is detected and, when this flag TMACT is set to 0, the decision subroutine is terminated, and when the flag TMACT is set to 1, shift is made to step 323.

The flag TMACT is adapted to be set to 1 at step 109 to be described and said step 305 and therefore, the flag TMACT is set to 1 only during the focus detecting operation after a photographing operation has been performed, or only when the in-focus judgement has been done and the processing of steps 305 and 306 has been effected, and the flag TMACT is set to 0 in the other cases.

Accordingly, when a photographing operation is not being performed or when the in-focus judgement is not done earlier in the focus detecting operation, the decision subroutine is immediately terminated, and during the focus detecting operation after the photographing operation or when the in-focus judgement is once done in the focus detecting operation, shift is made to step 323.

Description will now be made of a case where it is assumed that the in-focus judgement has been done earlier and the judgement that the defocus amount is greater than said predetermined value CHSFLG has been brought in the focus detecting operation after that.

In such case, it is detected at step 322 that the flag TMACT is set to 1 and shift is made to step 323, where the product f×$C_T$ of the focal length information f of the lens and a predetermined value $C_T$ is found, and this product f×$C_T$ is set as a timer time TMLNG and advance is made to step 324.

Step 324: At this step, the timer time TMLNG is compared with the lapse time from the point of time at which in-focus has been attained earlier and the counting of a lens driving restriction timer has been started at step 306. If the lapse timer time>TMLNG, that is, if the timer time TMLNG has elapsed after infocus has once been attained, the flag TMACT is set to 0 at step 325, and on the other hand, if TMLNG>the lapse timer time, that is, if the time TMLNG has not yet elapsed after in-focus has once been attained, the flag LMVDI is set to 1 at step 326 and the decision subroutine is terminated.

In a state in which the lens driving by the defocus amount based on the result of the focus detection is effected by the operations of the above-described steps 320-326, when said defocus amount is a small defocus within CHSFLD, the lens driving based on said defocus amount is effected at step 106 to be described immediately after the termination of the judgement subroutine, and if the defocus amount found in the focus detecting operation in a state in which the in-focus judgement has not been done earlier or a state in which a photographing operation is not performed is a great defocus exceeding CHSFLD, the lens driving based on this defocus amount is effected at step 106 to be described immediately after the termination of the decision subroutine.

Accordingly, in a case where a great defocus has been detected in the focus detecting operation when a photographing operation has not been performed earlier and the focus detecting operation when the in-focus judgement is not done in the focus detecting operation, and in a case where a small defocus has been detected in the focus detecting operation, the lens driving always based on the calculated defocus amount is effected. Also, after a photographing operation has been performed earlier or when the in-focus judgement has once been done in the focus detecting operation, the lens driving is inhibited from after said photographing operation or said in-focus judgement has been done until said time TMLNG has elapsed, and the lens driving based on the calculated defocus amount is started after the lapse of said time. The reason why, as described above, when the detection of the great defocus amount has been done in the focus detecting operation after the in-focus judgement has once been done, the lens driving is effected after the lapse of said time is as follows.

As a situation under which a great defocus is detected in the focus detecting operation after the in-focus judgement, there may be conceived a state in which the lens is pointed at an object to be photographed lying at a position entirely differing from the object to be photographed during the in-focus judgement. Such a situation occurs, for example, when the distance measuring field of the camera deviates from the object to be photographed to which the lens should originally be focused, due to a hand vibration. In such case, when the lens is immediately driven on the basis of the defocus amount obtained as a result of the focus detection, the lens driving will be done to focus the lens to an object to be photographed different from the object to be photographed to which the lens should originally be focused, whereafter the distance measuring field must be adjusted to the object to be photographed to which the lens should originally be focused, and then focus detection must be effected to render the lens focused to the original object to be photographed, and thus, wasteful operations are performed.

In the present invention, to prevent the inconvenience as noted above, the lens driving is inhibited for a predetermined time in the detection of a great defocus after the in-focus so that even if the photographer takes off the distance measuring field from the object to be photographed due to a hand vibration, the distance measuring field can be returned to the original object to be photographed, and even in the above-mentioned case, the lens is prevented from being moved from the object to be photographed to which the lens is focused, under the influence of a hand vibration. Also, the above-noted problem of hand vibration is more liable to arise as the focal length of the lens is longer and therefore, in the present invention, said time TMLNG is set to a longer time on the basis of the focal length information f of the lens as the focal length is longer. The focal length information f of the lens is pre-stored in the microcomputer PRS by rendering the signal CLCM from the microcomputer PRS into H when the defocus amount is calculated at step 201 of the focus detection subroutine, transmitting the signal SO to the communication buffer circuit LCM, transmitting the buffer signal DCL of the signal SO to the control circuit LPRS, reading out various parameters including the focal length of the lens, and inputting these parameters as signals DLC and SI to the microcomputer.

The reason why in the case of a small defocus, the lens driving is immediately effected irrespective of said time TMNNG is that the small defocus often represents the defocus amount provided by the movement of the object to be photographed in a state in which the original object to be photographed has been grasped in the distance measuring field and in such case, the lens is caused to follow the movement of the object to be photographed.

Also, the reason why the lens driving ss started after the lapse of said timer time TMLNG when a great defocus has been detected after a photographing operation has been performed is similar to that in the above-described case.

The operations of the judgement subroutine are as described above, and may be put in order as follows:

(1) In-focus judgement: as shown in Table 1

(2) Judgement of the impossibility of focus detection: as shown in Table 1

(3) The cases where the lens driving is impossible:

(a) When the lens position is at the close distance limit and the direction of driving is toward the close distance, the impossibility of focus detection is judged.

(b) When the lens position is at the infinity limit and the direction of driving is toward the infinity, if the preceding in-focus judgement has been done and the defocus amount is within $A_2$, the in-focus is judged, and in the other cases, the impossibility of focus detection is judged.

If the preceding in-focus judgement has not been done, when the defocus amount is within $A_1$ ($A_2 > A_1 > $ JFFLD), the in-focus is judged and in the other cases, the impossibility of focus detection is judged.

(4) The other cases than the cases (1), (2) and (3):

(a) When the defocus amount is small, that is, within CHSFLD, the lens is immediately driven on the basis of the defocus amount.

(b) The case where the defocus amount is great, that is, greater than CHSFLD:

(b)-1 When the predetermined time TMLNG has not elapsed after the in-focus judgement has once been done or after the exposure operation (the photographing operation) has been terminated, the lens driving based on the defocus amount is effected after the lapse of said time.

(b)-2 In the other cases than the above-mentioned case (b)-1, the lens driving based on the defocus amount is immediately effected.

When the above-described judgement subroutine is terminated, return is made to the AF control routine and shift is made to step 104, where the display subroutine is executed. In this subroutine, when the decision subroutine result flag JFFLG is set to 1, that is, when the lens is in focus, signal CDDR is rendered into H by the microcomputer PRS, and a display circuit DDR is designated and the set information 1 of the flag JFFLG is transmitted as the signal SO to the circuit DDR. The circuit DDR is responsive to the signal SO to turn on the in-focus display LED in the display device DSP and effect the display of the in-focus.

Also, when flag AFNG has been set to 1, that is, when the focus detection is impossible, the set information 1 of the flag AFNG is likewise transmitted to the circuit DD to turn on an LED for displaying the impossibility of focus detection and inform hhe photographer that the focus detection is impossible.

After the above-described display subroutine has been executed, step 105 is executed.

Step 105: The set condition of the flag LMVDI is detected.

This flag is set to 1 only at the steps 304, 313 and 326 of the decision subroutine. Consequently, 1 is set in tiis flag only during the judgement of the in-focus, during the judgement of the impossibility of focus detection and when the lapse of the timer time TMLNG is waited for.

Accordingly, in each of the above-mentioned states, the AF control subroutine is terminated and shift is made to step 1 without the lens driving subroutine to be described being executed, that is, without the lens driving being effected, and in the other states than said states, shift is made to step 106, where the lens driving subroutine is executed.

In the lens driving subroutine, the signal CLCM is rendered into H by the microcomputer PRS and the circuit LCM is designated.

Also, the defocus amount is transmitted as the signal SO to the circuit LCM, and the signal SO is transmitted as the signal DCL to the control circuit LPRS. The circuit LPRS renders a signal LMF or LMR into H in conformity with said defocus amount, revolves the motor LMTR in the direction determined in conformity with the defocus amount and moves the photo-taking lens LNS in the direction of the optic axis. The amount of movement of this lens is monitored by the encoder ENC, which thus outputs a signal SENC corresponding to the amount of movement, and this signal SENC is compared with a signal representative of said defocus amount transmitted to the circuit LPRS, and when the two signals become coincident with each other, the signals LMF and LMR are rendered into L, whereby the revolution of the motor LMTR is stopped to terminate the lens driving.

When the driving of the lens is started by the above-described operation (step 106), the lens driving subroutine is terminated and shift is made to step 106', where flag PRMV for indicating that the lens has been driven is set to 1, and then shift is made to step 107.

Step 107: The defocus amount DEF is compared with a predetermined value NJF, and when DEF>NJF, the AF control subroutine is terminated, and when DEF<NJF, flag NEXTJF is set to 1 at step 108, and the AF control subroutine is terminated.

The predetermined value NJF is set to a defocus amount which can be regarded as the vicinity of in-focus.

Accordingly, when the defocus amount is in the vicinity of in-focus, 1 is set in the flag NEXTJF and the AF control subroutine is terminated.

Thus, a series of AE and AF control operations are terminated by the above-described steps.

The operation control is done in the manner described above, and the above-described operations will be put in order as follows to clarify the foregoing description.

When the power source switch is closed during the first photographing and the first-stage operation of the shutter button is effected in this state, the AE control is effected and photometry and calculating process are effected. Thereafter, shift is made to the AF control.

In the first photographing, focus detection and decision subroutines are immediately executed and the focus state is detected and judged. When in-focus is judged by the first focus detection, the in-focus display is effected and thereafter, as long as the first-stage operation is maintained and the switch SW$_1$ is ON, the AE control and the AF control continue to be effected.

Also, when the impossibility of focus detection is judged by the first focus detection, the display of the impossibility of focus detection is effected and thereafter, as long as the switch SW$_1$ is ON, the AE control and the AF control are repetitively executed.

Also, when the in-focus or the impossibility of focus detection is not judged by the first focus detection, the lens is driven by the detected defocus amount.

The above-described operation is the operation based on the result of the first focus detection.

Description will now be made of each operation after the above-described operation based on the result of said first focus detection has been performed.

Description will first be made of a case where the in-focus has been judged in the first focus detection. In this case, the in-focus continues to be maintained while remaining displayed as long as the in-focus judgement is done in the second and subsequent focus detections. Even when the vicinity of in-focus is judged in a state in which there is no high degree of reliability in the second and subsequent focus detections, the infocus is maintained while remaining displayed. That is, as long as the vicinity of in-focus continues to be judged in a state in which the in-focus judgement or a high degree of reliability is not obtained in the second and subsequent focus detections, the in-focus display continues to be effected.

The other judgements than the judgement of the vicinity of in-focus and the judgement of the impossibility of focus detection under the focus detecting condition in which the in-focus judgement and a high degree of reliability are not obtained in the focus detection in the state in which said in-focus display is being effected are done, and when the then defocus amount is within CHSFLD, i.e., is a small defocus, the lens driving is immediately effected in conformity with the defocus amount. Also, when the defocus amount is greater than CHSFLD, the lens driving in conformity with said defocus amount is effected after the lapse of a time corresponding to the focal length of the time.

Description will now be made of the operation after the judgement of the impossibility of focus detection has been done in the firs focus detecting operation. When the judgement of the impossibility of focus detection continues to be done in the second and subsequent focus detecting operations and when the judgement of the vicinity of in-focus continues to be done in the state in which a high degree of reliability is not obtained, the display of the impossibility of focus detection coninues to be effected.

Also, when the other judgements than the judgement of the vicinity of in-focus are done in a state in which the judgement of the in-focus, the judgement of the impossibility of focus detection and a high degree of reliability are not obtained during the repeated focus detecting operation, the lens driving in conformity with the detected defocus amount is immediately effected.

Description will now be made of the operation after the lens driving based on the result of the first focus detecting and judging operation has been effected.

In this case, at said step 106, the lens is driven by the detected defocus amount, whereafter shift is made to the AE control subroutine, where photometry and calculating process are effected, and thereafter the AF control subroutine is again executed. At this time, the lens driving based on the result of the preceding focus detecting and judging operation is effected and therefore, after the lens driving, at step 106', flag PRMV is set to 1 and thus, at step 100 when the AF control subroutine is again executed, it is detected without fail that the flag PRMV is set to 1, and advance is made to step 111 and subsequent steps.

That is, step 111 and subsequent steps are not executed until the lens driving based on the defocus amount at the last time has been effected.

Step 111: Whether the lens is in its stopped state is judged. This judgement is accomplished by rendering the signal CLCM of the microcomputer PRS into H, designating the circuit LCM, suppliing the signal SO to the circuit LCM, and transmitting the signal SO as a signal DCL to the control circuit LPRS by the circuit LCM.

The signal SO in this case is a lens stop detection command, and by this command being transmitted to the circuit LPRS, the circuit LPRS effects the detection of the monitor signal SENC from the encoder ENC. This monitor signal SENC is produced when the lens is being driven, and the circuit LPRS detects the presence or absence of said monitor signal and transmits the result of the judgement of the presence or absence of the monitor signal as a signal DLC to the circuit LCM, whereafter the circuit LCM repetitively applies this signal DLC as the signal SI to the microcomputer PRS.

At step 111, whethertthe monitor signal has been produced is judged as a result of the judgement of the presence or absence of the thus detected monitor signal, and when the monitor signal has been produced, that is, when the lens is in its driven state, the AF control subroutine is terminated. Accordingly, as long as the lens is in its driven state, judgement as to whether the lens has been stopped continues to be done at step 111 in the AF control subroutine.

When the lens is stopped while the judgement of the stoppage of the lens is thus repetitively done, advance is made to step 112 for the first time and flag PRMV is set to 0, and at step 113, whether the lens has been driven by said defocus amount and stopped or has been shifted for example to the infinity side or close distance side limit position and as a result, has become unable to be driven and has been stopped is discriminated.

This discrimination, like the above-described judgement of the stoppage of the lens, is accomplished on the basis of the signal SENC. That is, at this step 113, the signal SENC representative of said amount of movement obtained during said lens driving is compared with the then defocus amount, and when SENC < the defocus amount, it is considered that the lens driving is impossible and the lens has been stopped.

When it is judged at said step 113 that the lens has been properly driven on the basis of the defocus amount, flag LCRN is set to 0 at step 114 and thereafter, shift is made to step 117, and when it is judged that the lens has become unable to be driven, the flag LCRN is set to 1 at step 115, and at step 116, the defocus amount DEF detected at the last time is stored in a memory LDIR, whereafter shift is made to step 117.

Step 117: The judgement of the auto-focus mode is done. This judgement is accomplished by rendering the signal CDDR from the microcomputer PRS into H, designating the circuit DDR, inputting to the microcomputer PRS the set condition of a mode selecting switch provided in the input switch group SWS as the signal SI, and discriminating the set condition of the mode selecting switch.

Let is be assumed that the servo mode has been set by the mode selecting switch. In this case, step 101 and subsequent steps are again executed.

When the lens driving has been effected on the basis of the first focus detecting and judging operation in the servo mode in the manner described above, confirmation of the stoppage of the lens driving and judgement as to whether the lens has become unable to be driven are done, whereafter the operations of step 101 and subsequent steps are again executed. Accordingly, if the focus detecting and judging operation is again performed after the lens driving and as a result, the lens is shifted to the in-focus state by said lens driving, the display of the in-focus state will be effected, and if the judgement of the impossibility of focus detection is done, the display of the impossibility of focus detection will be effected, and if the judgement of the in-focus and the impossibility of focus detection is not done, the lens driving based on the calculated defocus amount will be effected.

Accordingly, the above-described operation is repetitively executed until the in-focus state is attained.

Also, even if the in-focus state is once attained, said AF control is repeated and therefore, when the object to be photographed has moved, it is detected and the lens is driven to the in-focus position. It should be noted that since this lens driving takes place after the in-focus has once been attained, the lens driving is effected after the lapse of the aforementioned time TMLNG after the in-focus has been attained.

The above-described operation refers to the case where in the servo mode, the lens has been driven depending on the result of the first focus detection, but even after the in-focus or the impossibility of focus detection is judged as a result of the first focus detection and thereafter the object to be photographed moves and said lens driving is effected to focus the lens to the moving object to be photographed, a similar operation will take place and the lens driving will be effected to focus the lens always to the object to be photographed.

Also, when during said lens driving, the lens is shifted to the limit position and at step 115, 1 is set in the flag LCRN, said steps 315-399 are executed in the decision subroutine thereafter and therefore, when the lens is in the close distance position by the preceding lens driving and the direction of diving is directed toward the close distance by the current focus detection or when the lens is in the infinity position by the preceding lens driving and the direction of driving is directed toward the infinity by the current focus detection and further the then defocus amount is above the predetermined value $A_1$ or $A_2$, the above-described processing for the judgement of the impossibility of focus detection is effected and in such case, the lens driving based on the result of the current focus detectoon is inhibited.

Also, when the less is likewise in the infinity position by the preceding lens driving and the infinity direction is indicated by the current focus detection and further the then defocus amount is within the predetermined value $A_1$ or $A_2$, the above-described processing for the judgement of in-focus is effected, and again in this case, the lens driving based on the result of the current focus detection is inhibited.

The above-described operation is that during the servo mode, and description will now be made of the operation when the one-shot mode has been judged at step 117.

The one-shot mode is judged at step 117, and is identical to the servo mode in the operation from after the power source switch is closed until the lens is once driven on the basis of the calculated defocus amount.

That is, again in the one-shot mode, the detection of the defocus amount is effected by the focus detecting and judging operation and the lens driving by the defocus amount is effected.

In executing the AF control subroutine after the lens driving has been effected in this manner, steps 111-116 are executed, whereafter steps 117 and 118 are executed. In this case, since the lens driving has been effected, the flag JF is not set to 1 and shift is made to step 119. At the step 119, the condition of the flag NEXTJF is detected, and this flag is set to 0 when the defocus amount during the preceding lens driving is greater than a predetermined value NJF, and is set to 1 when said defocus amount is smaller than said predetermined value NJF.

Accordingly, when a great defocus amount is judged in the preceding focus detecting and judging operation, the operations of step 101 and subsequent steps are performed and after the lens driving, focus detection and judgement are again done, and whether the lens has been shifted to the in-focus position as a result of said lens driving is judged.

When the in-focus has been judged in this second focus detection and judgement, the flag JF is set to 1 and therefore, when the AF control subroutine after said second focus detecting and judging operation is executed, it is detected at step 118 that the flag JF is set to 1, and shift is made to step 121, where the in-focus display subroutine is executed to display the in-focus. In the one-shot mode, once the judgement of in-focus is done in this manner, shift is immediately made to step 121 after step 118 and thus, the focus detecting and judging operation and lens driving thereafter are inhibited.

Also, when the judgement of in-focus is not done in the second focus detecting and judging operation after said first lens driving, the lens driving is again effected on the basis of the calculated defocus amount, whereafter said operation is repeated until the judgement of in-focus is done and, after the shift to the in-focus state, the focus detection and judgement and lens driving are inhibited.

The above-described operation refers to the case when a great defocus amount has been detected during the first lens driving, but when a small defocus amount has been detected, it is detected at step 119 that the flag NEXTJF is set to 1 and therefore, shift is made to steps 120', 120 and 121.

Accordingly, when the defocus amount when the lens driving has been effected in the one-shot mode is small, that is, the lens has been driven from the vicinity of in-focus toward the in-focus position, as long as the lens is not unable to be driven, shift is made to step 121 without the second focus detecting and judging operation being performed, whereby the infocus is displayed, and the focus detection and judgement and lens driving thereafter are inhibited. It is to be understood that at step 121, the flag JF is set to 1 and the display of in-focus is effected.

When in the one-shot mode, the preceding defocus amount is thus below the predetermined value and the lens has been driven from the position of the vicinity of in-focus toward the in-focus position, it is considered that the lens has been moved to the in-focus position, and the display of in-focus is immediately effected without the second focus detecting and judging operation being performed after the lens driving to confirm whether the in-focus state has been attained, and thereby the time required for the shift to the in-focus during the one-shot mode is shortened.

Also, even if a small defocus amount is detected during the one-shot mode and steps 119, 120' and 120 have been executed, when the flag LCRN is set to 1, that is, when the lens is stopped at the limit position as a result of the lens driving during the one-shot mode, advance is not made to step 121 but shift is made to step 101, where the second focus detecting and judging operation is performed. Thus, whether the lens has not been shifted to the in-focus position but has been stopped at the limit position is confirmed, and when it is confirmed that the lens is stopped at the in-focus position, the display of in-focus is effected, and in the other case than that, the above-described focus detecting and judging operation is repeated and finally, the lens is shifted to the in-focus state.

As described above, in the one-shot mode, when the lens has been driven by a small defocus amount, it is considered that the lens has been shifted to the in-focus position, and the auto-focus sequence is terminated without the second focus detecting and judging operation after the lens driving being performed, only in the case where the lens is stopped at the limit position, said second focus detection and judgement is done and therefore, even if the processing of regarding the shift ff the lens during the small defocus as the shift to the in-focus position as described above is effected, the lens is ensured to be shifted to the in-focus position without greatly deviating from the in-focus state.

In the embodiment illustrated, steps 119 and subsequent steps are executed not only during the one-shot mode, but in the servo mode as well, step 119 and subsequent steps may always be executed and when the defocus amount is in the vicinity of in-focus, the display of in-focus may be effected before the second focus detecting operation is performed.

Also, as the method of judging the impossibility of lens driving, for example, the encoder may be constituted by a pulse plate for forming a pulse when the lens is being driven, and whether a pulse is output from the encoder ENC for a predetermined time or longer when the motor LHTR is supplied with electric power may be judged on the basis of the defocus amount so that the impossibility of lens driving may be judged when said pulse is not formed.

As another method, a switch adapted to be closed when the lens has been shifted to the limit position of the infinity end or the close distance end may be disposed so that during the driving of the motor, said switch may detect the shift of the lens to the limit position and the impossibility of lens driving may be judged.

As described above, in the present invention, when the defocus amount is below a predetermined value, in-focus is indicated immediately after the lens driving and thus, the time until in-focus is indicated can be shortened and the rapidity of photographing can be improved while, on the other hand, when the lens driving based on the defocus amount is not normally effected, the indication of in-focus after the lens driving is inhibited even in the situation as described above and the second focus detecting operation is performed and therefore, even when the improvement in rapidity of photographing is achieved by the above-described system, the reliability with which in-focus is indicated can be kept high.

I claim:

1. A camera having an auto-focus apparatus, including:

(a) a focus detecting circuit for detecting the focus state of an imaging optical system and outputting a focus signal representative of the focus state;

(b) a first judging circuit for judging on the basis of said focus signal whether said focus signal is of a value representative of in-focus;

(c) a driving circuit for effecting the driving of said imaging optical system based on said focus signal when the judgement of in-focus is not done by said first judging circuit;

(d) a second judging circuit for judging how much the focus signal judged as to whether in-focus or not by said first judging circuit deviates from the value representative of in-focus when the driving of said imaging optical system based on said focus signal is effected, said second judging circuit being adapted to judge in-focus when said focus signal does not so much deviate from the value representative of in-focus; and (e) discriminating means for discriminating whether the driving of said imaging optical system based on the focus signal by said driving circuit is proper and inhibiting the judgement by said second judging circuit when said imaging optical system is not properly driven.

2. A camera having an auto-focus apparatus, including:

(a) a focus detecting circuit for detecting the focus state of an imaging optical system and outputting a focus signal representative of the focus state;

(b) a driving circuit for driving said imaging optical system by an amount based on the focus signal from said focus detecting circuit;

(c) a sequence control circuit for alternately repetitively effecting the focus detecting operation by said focus detecting circuit and the driving operation of said imaging optical system by said driving circuit;

(d) a judging circuit having a first judging operation for discriminating whether the focus signal from said focus detecting circuit is indicative of a predetermined value representative of in-focus and judging the in-focus when the focus signal is indicative of said predetermined value, and a second judging operation for judging the in-focus when said focus signal is not indicative of said predetermined value but is indicative of a value representative of a focus state not so far from in-focus; and (e) discriminating means for discriminating whether the driving of said imaging optical system conforming to the focus signal by said driving circuit has been normally effected, said second judging operation of said judging circuit being inhibited when it is discriminated by said discriminating means that the normal driving conforming to the focus signal has not been effected.

3. A camera having an auto-focus apparatus, including:

(a) a focus detecting circuit for detecting the focus state of an imaging optical system and outputting a focus signal representative of the focus state;

(b) a driving circuit for driving said imaging optical system by an amount based on the focus signal from said focus detecting circuit;

(c) a sequence control circuit for alternately repetitively effecting the focus detecting operation by said focus detecting circuit and the driving operation of said imaging optical system by said driving circuit;

(d) an in-focus judging circuit having a first mode for effecting in-focus judgement on the basis of the focus signal obtained in the focus state detection by said focus detecting circuit after the driving of said imaging optical system based on said focus signal when the driving of said imaging optical system by said driving circuit is effected, and a second mode for effecting in-focus judgement on the basis of a focus signal which has driven said imaging optical system independently of the focus signal obtained in th focus state detection by said focus detecting circuit after the driving of said imaging optical system when the driving of said imaging optical system by said driving circuit based on the focus signal is effected, the in-focus being judged in said first mode when the focus signal is indicative of a value representative of in-focus, the in-focus being judged in said second mode when the focus signal is not indicative of the value representative of in-focus but is indicative of a value representative of the vicinity of in-focus; and (e) discriminating means for discriminating whether the driving of said imaging optical system based on said focus signal has been properly effected, said second mode of said in-focus judging circuit being inhibited when it is discriminated by said discriminating means that the proper driving of said imaging optical system has not been effected.

4. A camera according to claim 3, further including indicating means for effecting the indication of in-focus when the in-focus is judged in said first or second mode.

5. A camera according to claim 3, wherein said second mode is executed when the driving of said imaging optical system based on the focus signal which has been the subject of the in-focus judgement in said first mode has been effected in a case where in-focus is not judged in the in-focus judgement in said first mode.

6. A camera according to claim 4, wherein said second mode is executed when the driving of said imaging optical system based on the focus signal which has been the subject of the in-focus judgement in said first mode has been effected in a case where in-focus is not judged in the in-focus judgement in said first mode.

7. A camera according to claim 5, wherein said sequence control circuit inhibits the driving operation of said imaging optical system after in-focus has been judged in said first or second mode.

* * * * *

Notice of Adverse Decisions in Interference

In Interference No. 101,515, involving Patent No. 4,792,821, A. Akashi, AUTO-FOCUS APPARATUS IN A CAMERA, final judgment adverse to patentee was rendered March 25, 1991, as to claims 1-7.

*(Official Gazette August 27, 1991)*